United States Patent
Lee

(10) Patent No.: US 7,941,617 B2
(45) Date of Patent: May 10, 2011

(54) SYSTEM AND DEVICE HAVING ALTERNATIVE BIT ORGANIZATION

(75) Inventor: Dong-woo Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 526 days.

(21) Appl. No.: 12/127,148

(22) Filed: May 27, 2008

(65) Prior Publication Data
US 2008/0301392 A1  Dec. 4, 2008

(30) Foreign Application Priority Data
May 29, 2007  (KR) .................. 10-2007-0052196

(51) Int. Cl.
*G06F 12/00* (2006.01)
(52) U.S. Cl. ........................................ 711/154
(58) Field of Classification Search .................. None
See application file for complete search history.

(56) References Cited

U.S. PATENT DOCUMENTS
2005/0262295 A1 * 11/2005 Nataraj et al. ............... 711/108

FOREIGN PATENT DOCUMENTS
| JP | 2003196153 | 7/2003 |
| JP | 2004334257 | 11/2004 |
| JP | 2005228055 | 8/2005 |

* cited by examiner

*Primary Examiner* — Hiep T Nguyen
(74) *Attorney, Agent, or Firm* — Volentine & Whitt, PLLC

(57) ABSTRACT

A system is disclosed that includes a first memory device operable according to either a first bit organization or a second bit organization, a second memory device operable according to only the first bit organization, and a central processing unit (CPU). The CPU is commonly connected to the first and second memory devices via a command/address bus, and is connected to the first memory device via a data bus separate from the command/address bus and having an upper half and a lower half. However, the CPU is connected to the second memory device via only the upper half of the data bus.

18 Claims, 4 Drawing Sheets

SYSTEM AND DEVICE HAVING ALTERNATIVE BIT ORGANIZATION

CROSS-REFERENCE TO RELATED PATENT APPLICATION

This application claims the benefit of Korean Patent Application No. 10-2007-0052196 filed on May 29, 2007, the subject matter of which is hereby incorporated by reference.

BACKGROUND OF THE INVENTION

1. Field of the Invention

The present invention relates to a memory device and a system incorporating same. More particularly, the invention relates to a system and related memory device wherein the memory device has alternative bit organizations selectable by a system central processing unit (CPU).

2. Description of the Related Art

Within various contemporary systems, various memory devices are configured for use with the system's central processing unit (CPU). That is, one or more volatile memory devices, such as dynamic random access memory (DRAM) and/or static random access memory (SRAM) may be configured for use with the CPU. Additionally or alternatively, one or more nonvolatile memory (NVM) devices, such as NAND type flash memory and/or NOR type flash memory, may be configured for use with the CPU.

Many different memory system architectures may be configured in this manner. For example, one system configuration of note includes a low power dual data rate (LPDDR) nonvolatile memory (NVM) configured to share a common bus with a DRAM. This type of system configuration is becoming a de facto standard of sorts for many mobile electronic devices. U.S. Pat. No. 6,721,212 describes this configuration and related design and implementation aspects in some additional detail and is hereby incorporated by reference.

FIG. (FIG.) 1 is a block diagram of a conventional system configuration including a NVM and a DRAM connected to a CPU via a common bus. In the system shown in FIG. 1, a first data bus (DQ0-15 or DQ0-31) associated DRAM 11 and a second data bus DQ'0-15 associated with NVM 13 are separately connected to CPU 15. Additionally, a command/address bus CMD/ADD is shared by both DRAM 11 and NVM 13. A first chip select signal CS0 is applied to DRAM 11 and a second chip select signal CS1 is applied to NVM 13.

Since the first data bus (DQ0-15 or DQ0-31) associated with DRAM 11 and the second data bus DQ'0-15 associated with NVM are separate in the system shown in FIG. 1, it is possible to access both DRAM 11 and NVM 13 simultaneously and thus there is an advantage of improved system performance.

However, in a case where the first data bus associated with DRAM 11 is configured as an X32 bit data bus (DQ0-31), there is a drawback of increased cost due to an increased number of bus signal lines and related Input/Output (I/O) pins within the system.

FIG. 2 is a block diagram of another conventional system configuration comprising a NVM and a DRAM. In the system shown in FIG. 2, both a data bus DQ0-15 and a command/address bus CMD/ADD are shared by a DRAM 21 and a NVM 23. That is DRAM 21 and NVM 23 are connected to CPU 25 via data bus DQ0-15 and the command/address bus CMD/ADD. Here again, the first chip select signal CS0 is applied to DRAM 21 and the second chip select signal CS1 is applied to NVM 23.

Since the data bus DQ0-15 is shared between DRAM 21 and NVM 23, it is impossible to access DRAM 21 and NVM 23 simultaneously. Thus, there is a drawback of decreased overall system performance.

However, since the data bus is configured with a preset width of X16 bits (DQ0-15) and this data bus is shared by DRAM 21 and NVM 23, significantly fewer data bus signal lines and related I/O pins are required in the system.

SUMMARY OF THE INVENTION

Embodiments of the invention provide a memory device and an incorporating system having improved overall performance without also requiring a great number of data bus signal lines and I/O pins.

DESCRIPTION OF EMBODIMENTS

Embodiments of the invention will be described in some additional detail with reference to the accompanying drawings.

Figure 1:
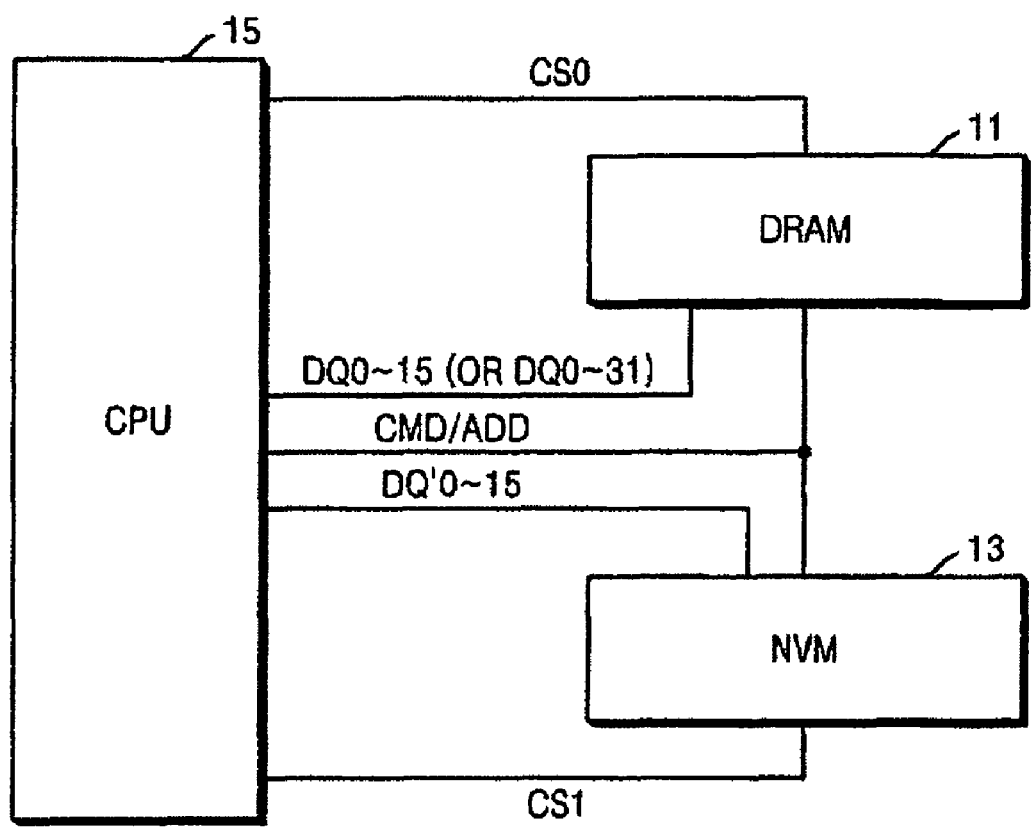
FIG. 1 is a block diagram of a conventional system configuration including a nonvolatile memory (NVM) and a dynamic random access memory (DRAM)
Figure 2:
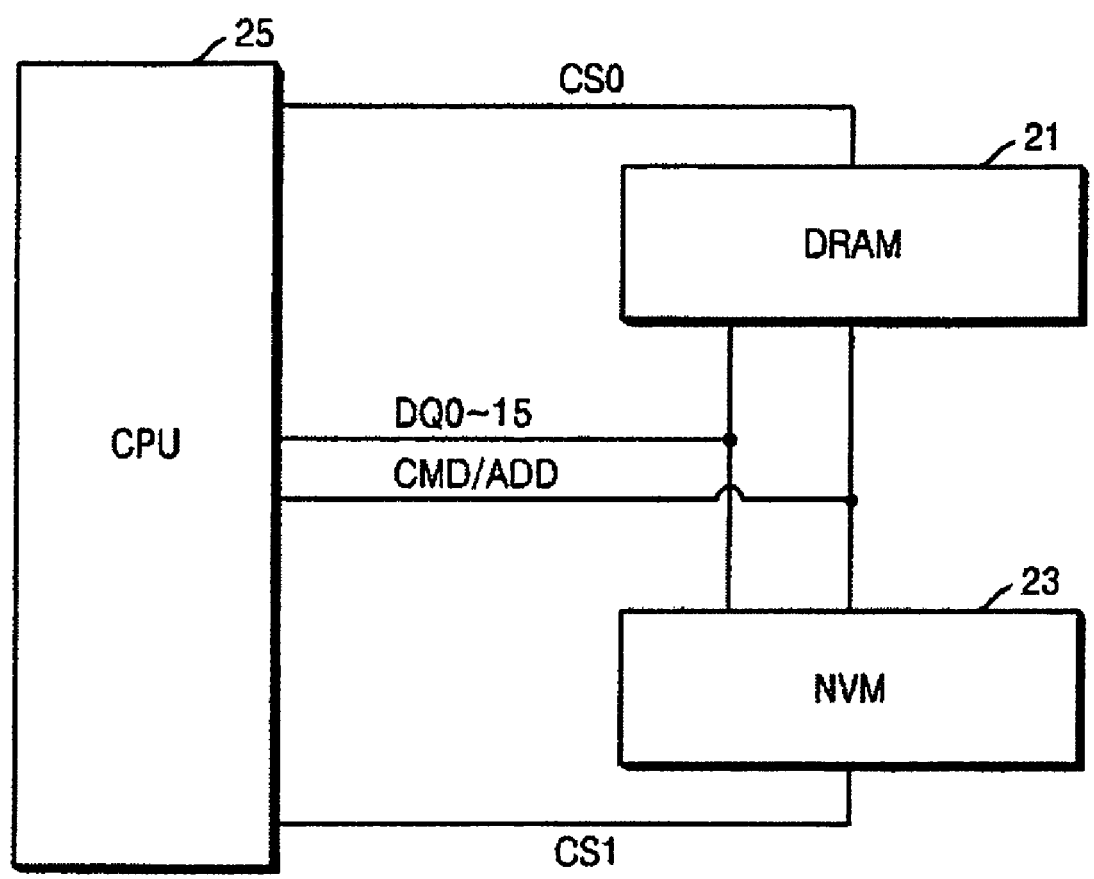
FIG. 2 is a block diagram of another conventional system configuration comprising a NVM and a DRAM.
Figure 3:
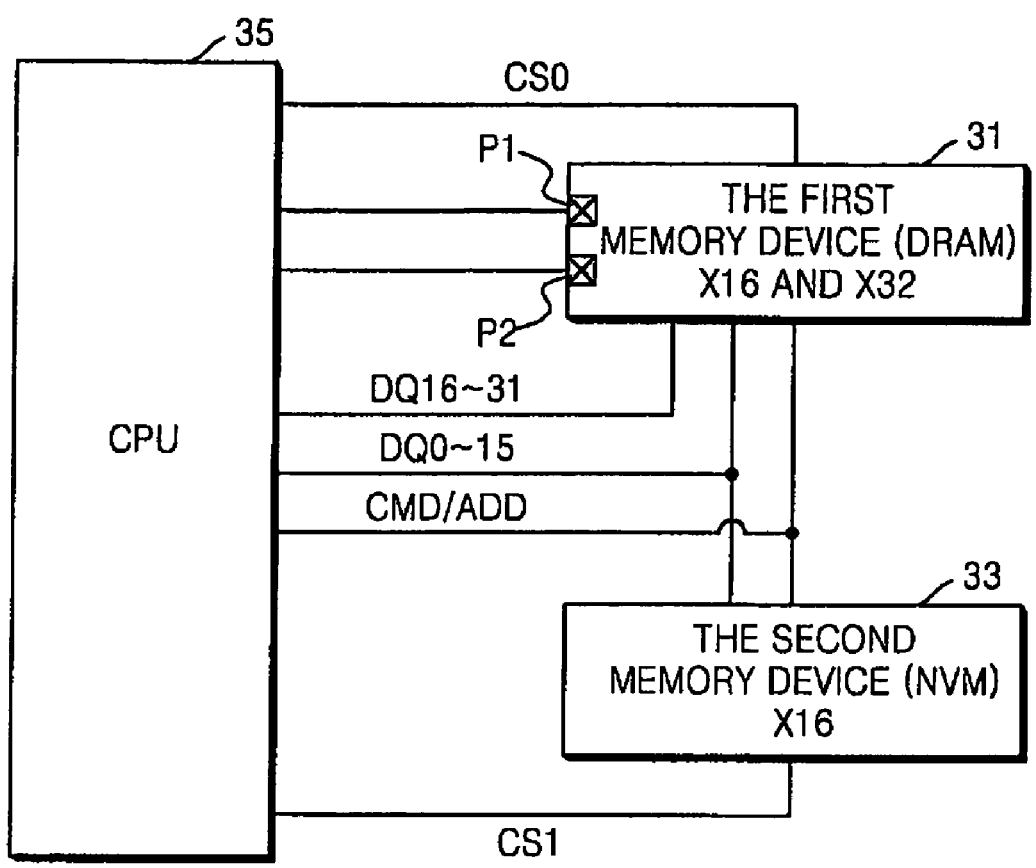
FIG. 3 is a block diagram of a system configuration according to an embodiment of the invention.

FIG. 3 is a block diagram of a system configuration according to an embodiment of the invention. Referring to FIG. 3, the system comprises a first memory device 31, a second memory device 33, and a central processing unit (CPU) 35 controlling access (e.g., controlling read/write/refresh or program/read/erase operations) to the first and second memory devices (31 and 33). In certain embodiments of the invention, first memory device 31 may be a dynamic random access memory (DRAM), and second memory device 33 may be a nonvolatile memory (NVM) such as a flash memory.

In the system of FIG. 3, a command/address bus CMD/ADD is connected to both first memory device 31 and second memory device 33. A lower half DQ0-15 of a data bus DQ0-31 is connected to both first memory device 31 and second memory device 33, and an upper half DQ16-31 of a data bus DQ0-31 is connected only to first memory device 31. That is, the command/address bus CMD/ADD and the lower half DQ0-15 of the data bus DQ0-31 are shared by first memory device 31 and second memory device 33, while the upper half DQ16-31 of the data bus DQ0-31 is only used by first memory device 31.

The command/address bus CMD/ADD, the lower half DQ0-15 of the data bus DQ0-31, and the upper half DQ16-31 of the data bus DQ0-31 are connected to CPU 35. In one embodiment of the invention, the command/address bus CMD/ADD is a unidirectional bus that communicates command and address information from CPU 35 to first memory device 31 and/or second memory device 33. However, the lower half DQ0-15 of the data bus DQ0-31 is a bidirectional bus that communicates data between CPU 35 and at least one of first memory device 31 and second memory device 33. The upper half DQ16-31 is a bidirectional bus that communicates data between first memory device 31 and CPU 35.

A first chip select signal CS0 may be used to select first memory device 31, and a second chip select signal CS1 may be used to select second memory device 33 in conventional manner.

The first memory device may be embodied to satisfy conditions such as those described hereafter to enable configuration of the system according to an embodiment of the invention.

First memory device 31 may be configured to include both an X16 bit organization corresponding to the lower half DQ0-15 of the data bus DQ0-31, (hereafter "a first bit organization"), or an X32 bit organization corresponding to entire data bus DQ0-31, (hereafter "a second bit organization"). Second memory device 33 may be configured to include a X16 bit organization corresponding to the lower half DQ0-15 of the data bus DQ0-31, namely the first bit organization.

The X16 bit organization is a bit organization where 16 bit data is output by first memory device 31 or second memory device 33 to the lower half DQ0-15 of the data bus DQ0-31 in parallel and simultaneously via 16 I/O pins. The X32 bit organization is a bit organization in which 32 bit data is output by first memory device 31 to the lower half DQ0-15 and upper half DQ16-31 of the data bus DQ0-31 in parallel and simultaneously via 32 data I/O pins.

In the system configuration shown in FIG. 3, both first memory device 31 and second memory device 33 operate according to the first bit organization in a case where first memory device 31 and second memory device 33 are intended to be simultaneously accessed. However, first memory device 31 may also be operated according to the second bit organization in a case where first memory device 31 is accessed, but second memory device 33 need not be simultaneously accessed.

Second, first memory device 31 may be configured to include a first bit organization selecting pin P1 capable of being set or reset according to an externally applied control signal provided by CPU 35. Thus, the first bit organization or the second bit organization for first memory device 31 may be selected by CPU 35 via the first selecting pin P1.

For example, as shown in Table 1, the first (X16) bit organization may be selected by a logical "0" value applied to the first selecting pin P1 by CPU 35, while the second (X32) bit organization may be selected by a logical "1" value applied to the first selecting pin P1 by CPU 35. In one embodiment of the invention, the control signal applied to first selecting pin P1 may be derived from an uppermost bit (CAxx) of a column address associated with data to be read from or written to first memory device 31.

TABLE 1

| P1 (or CAxx) | Bit Organization |
|---|---|
| 0 | X16 |
| 1 | X32 |

Third, first memory device 31 may be configured to have the same row address when operating according to the first (X16) bit configuration or the second (X32) bit configuration.

Fourth, first memory device 31 may be configured to include a second selecting pin P2 receiving a burst length control signal (BL) externally supplied by CPU 35 and controlling the burst length (i.e., the amount of data) for data read from or written to first memory device 31 during a data access operation. That is, the burst length control signal (BL) indicates to first memory device 31 a number of read data blocks that should be successively output by first memory device 31 in synchronization with an applied clock pulse CLK, as shown for example in the timing diagram of FIG. 4.

Fifth, the burst length control signal (BL) applied to first memory device 31 will be twice as long when first memory device 31 is operating according to the first (X16) bit organization as when it is operating in the second (X32) bit organization.

For example as shown in Table 2, if four (4) is selected as the bit length in the first (X16) bit organization in a case where a logic code "00" is sequentially applied by CPU 35 via the second selecting pin P2, then two (2) is selected as the bit length in the second (X32) bit organization. If eight (8) is selected as the bit length in the first (X16) bit organization in a case where a logic code "01" is sequentially applied by CPU 35 via the second selecting pin P2, then four (4) is selected as the bit length in the second (X32) bit organization. If sixteen (16) is selected as the bit length in the first (X16) bit organization in a case where a logic code "10" is sequentially applied by CPU 35 via the second selecting pin P2, then eight (8) is selected as the bit length in the second (X32) bit organization.

Although a case where first memory device 31 comprises a single second selecting pin P2 to receive logic code is sequentially applied, multiple selecting pins might be alternately used to accommodate parallel control bits. Alternately, a mode register set (MRS) may be conventionally provided in first memory device 31 instead of second selecting pin P2 to control the burst length of written to or red from first memory device 31. In this case, the bit length for first memory device 31 may be selected by the application of an externally provided code, such as the one shown in Table 2, to the mode register set MRS.

TABLE 2

| P2 (or MRS) | X16 | X32 |
|---|---|---|
| 00 | BL4 | BL2 |
| 01 | BL8 | BL4 |
| 10 | BL16 | BL8 |
| 11 | Reserved | Reserved |

Figure 4:
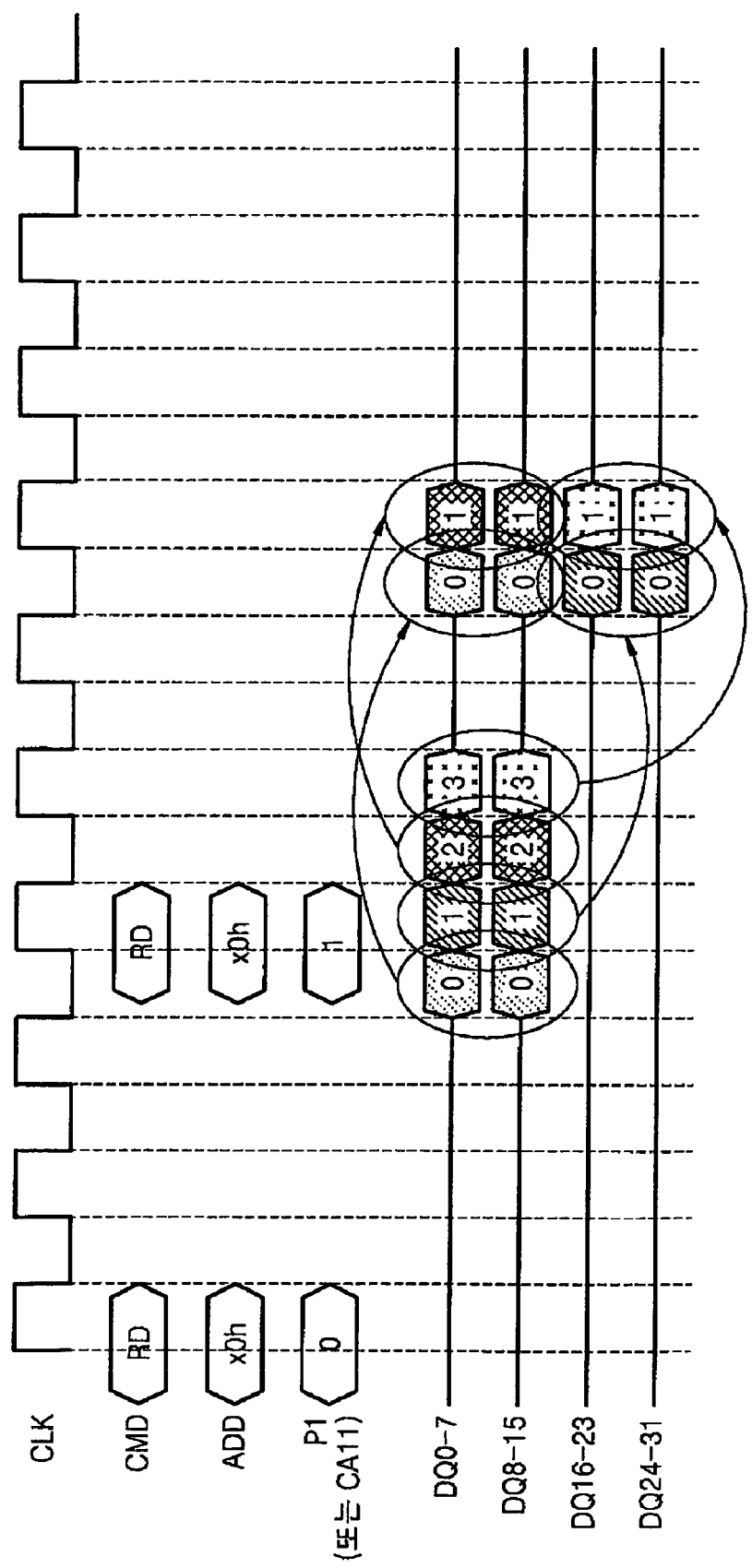
FIG. 4 is a related timing diagram further illustrating a case where data is read from a first memory device within the system of FIG. 3.

FIG. 4 is a timing diagram further illustrating a case where data is read from first memory device 31 in a system such as the one shown in FIG. 3.

As shown in FIG. 4, when a read command RD and one or more corresponding address bits x0h are applied to first memory device 31 by CPU 35 via the command/address bus CMD/ADD, and a logical "0" value is applied to first selecting pin P1, first memory device 31 will begin operation in the first (X16) bit organization.

Meanwhile, although it is not shown in the timing diagram of FIG. 4, if the logic code "00" is sequentially applied by CPU 35 to the second selecting pin P2 of first memory device 31, a four (4) block burst length will be selected for the read data provided by first memory device 31. As a result, four (4) blocks of 16 bit data are successively output by first memory device 31 via the lower half DQ0-15 of the data bus DQ0-31 in synchronization with a clock pulse CLK.

When the read command RD and the address x0h are applied to first memory device 31 by CPU 35 via the command/address bus CMD/ADD and logical "1" value is applied to the first selecting pin P1, first memory device 31 will operate according to the second (X32) bit organization. As described above, the address x0h applied in a case where first memory device 31 operates in the second (X32) bit organization must be identical to the address x0h applied in a case where first memory device 31 operates in the first (X16) bit organization.

Meanwhile, although not shown in the timing diagram of FIG. 4, if the logic code "00" is sequentially applied by CPU 35 via the second selecting pin P2, two (2) will be selected as the burst length in the X32 bit organization. As a result, two (2) blocks of 32 bit data will be successively output by first memory device 31 via the entire data bus DQ0-31 in synchronization with a clock pulse CLK.

The first 16 bit block of data output according to the first (X16) bit organization will be identical to the lower 16 data bits of the 32 data bits output according to the second (X32) bit organization, and the second 16 bit block of data output according to the first (X16) bit organization will be identical to the upper 16 data bits of the 32 bit data output according to the second (X32) bit organization. In this context, the term "identical data" means read from the same physical locations within first memory device 31, namely the same memory cells.

As described above, the lower half DQ0-15 of the data bus DQ0-31 is connected to both first memory device 31 and second memory device 33, and the upper half DQ16-31 of the data bus DQ0-31 is connected only to first memory device 31 in the system according to an embodiment of the invention. That is, the lower half DQ0-15 of the data bus DQ0-31 is shared by the first memory device and the second memory device, while the upper half DQ16-31 of the data bus DQ0-31 is only used by first memory device 31.

Accordingly, both first memory device 31 and second memory device 33 operate in X16 bit organization and share the lower half DQ0-15 of the data bus DQ0-31 in a case where first memory device 31 and second memory device 33 are accessed simultaneously, while only first memory device 31 operates in X32 bit organization and uses the entire data bus DQ0-31 in a case where first memory device 31 is accessed and second memory device 33 is not accessed.

Therefore, improved overall system performance may be obtained without the necessity of dramatically increasing the number of data bus signal lines and corresponding I/O pins.

While the present invention has been particularly shown and described with reference to exemplary embodiments thereof, it will be understood by those of ordinary skill in the art that various changes in form and details may be made therein without departing from the scope of the invention as defined by the following claims.

What is claimed is:

1. A system comprising:
   a first memory device operable according to either a first bit organization or a second bit organization;
   a second memory device operable according to only the first bit organization; and
   a central processing unit (CPU),
   wherein the CPU is commonly connected to the first and second memory devices via a command/address bus, and the CPU is connected to the first memory device via a data bus separate from the command/address bus and having an upper half and a lower half,
   wherein the CPU is connected to the second memory device via only the upper half of the data bus.

2. The system of claim 1, wherein when the first memory device is configured to operate according to the first bit organization, data is simultaneously communicated from the second memory device to the CPU via the upper half of the data bus and from the first memory device to the CPU via the lower half of the data bus, but when the first memory device is configured to operate according to the second bit organization, data is communicated from the first memory device to the CPU via the upper half and lower half of the data bus and is not communicated from the second memory device to the CPU.

3. The system of claim 2, wherein a row address associated with the communication of data from the first memory device to the CPU while operating in the first bit configuration is identical to a row address associated with the communication of data from the first memory device to the CPU while operating in the second bit configuration.

4. The system of claim 1, wherein the first memory device comprises a first selecting pin adapted to receive an externally provided control signal indicating whether the first memory device will operate according to the first bit organization or the second bit organization.

5. The system of claim 4, wherein the control signal is provided to the first selecting pin of the first memory device by the CPU.

6. The system of claim 2, wherein a burst length associated with the communication of data from the first memory device to the CPU while operating in the first bit organization is twice as long as a burst length associated with the communication of data from the first memory device to the CPU while operating in the second bit organization.

7. The system of claim 6, wherein the first memory device comprises a mode register set and the burst length of the first memory device is set by externally applied code to the mode register set.

8. The system of claim 6, wherein the first memory device comprises at least one second selecting pin adapted to receive an externally applied control signal indicating a burst length for the first memory device.

9. The system of claim 1, wherein the first memory device is a dynamic random access memory (DRAM).

10. The system of claim 1, wherein the second memory device is a nonvolatile memory (NVM).

11. A method of operating a system comprising a first memory device operable according to either a first bit organization or a second bit organization, a second memory device operable according to only the first bit organization, and a central processing unit (CPU), wherein the CPU is commonly connected to the first and second memory devices via a command/address bus, and the CPU is connected to the first memory device via a data bus separate from the command/address bus and having an upper half and a lower half, and the CPU is connected to the second memory device via only the upper half of the data bus, the method comprising:
   indicating the first bit organization or the second bit organization to the first memory device; and
   if the first bit organization is indicated, communicating data simultaneously from the first memory device to the CPU via the lower half of the data bus and from the second memory device to the CPU via the upper half of the data bus,
   else if the second bit organization is indicated, communicating data from only the first memory device to the CPU via the upper half and lower half of the data bus.

12. The method of claim 11, wherein indicating the first bit organization or the second bit organization to the first memory device comprises applying a binary logical value to a first selecting pin associated with the first memory device.

13. The method of claim 12, wherein the binary logical value is provided by the CPU to the first selecting pin associated with the first memory device.

14. A memory device connected to a Central Processing Unit (CPU) via a command/address bus and a data bus, the memory device comprising:
- a selecting pin configured to receive a control signal from the CPU indicating whether the memory device will operate according to a first bit organization or a second bit organization; and,
- a plurality of Input/Output (I/O) pins, wherein the plurality of I/O pins is operatively connected to a lower half of the data bus when the memory device is operated according to the first bit organization, and wherein the plurality of I/O pins is operatively connected to an upper half and the lower half of the data bus when the memory device is operated according to the second bit organization.

15. The memory device of claim 14, wherein a row address communicated from the CPU to the memory device via the command/address bus when the memory device is operated in the first bit configuration is identical to a row address communicated from the CPU to the memory device via the command/address bus when the memory device is operated in the second bit configuration.

16. The memory device of claim 15, wherein a burst length for data provided by the memory device in response to the row address communicated to the memory device when the memory device is operated in the first bit organization is twice as long as a burst length for data provided by the memory device in response to the row address communicated to the memory device when the memory device is operated in the second bit organization.

17. The memory device of claim 16, further comprising:
- a mode register set configured to receive externally provided code defining a burst length for the data provided by the memory device.

18. The memory device of claim 14, wherein the memory device is a DRAM.

* * * * *